(12) United States Patent
Hartmann et al.

(10) Patent No.: US 11,196,067 B2
(45) Date of Patent: Dec. 7, 2021

(54) LEAKAGE MONITORING OF A FUEL CELL SYSTEM

(71) Applicant: Robert Bosch GmbH, Stuttgart (DE)

(72) Inventors: Alexander Hartmann, Ludwigsburg (DE); Helerson Kemmer, Vaihingen (DE); Johannes Schild, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 491 days.

(21) Appl. No.: 15/778,235

(22) PCT Filed: Sep. 29, 2016

(86) PCT No.: PCT/EP2016/073351
§ 371 (c)(1),
(2) Date: May 23, 2018

(87) PCT Pub. No.: WO2017/089015
PCT Pub. Date: Jun. 1, 2017

(65) Prior Publication Data
US 2018/0342748 A1 Nov. 29, 2018

(30) Foreign Application Priority Data
Nov. 23, 2015 (DE) .................... 10 2015 223 020.1

(51) Int. Cl.
| | | |
|---|---|---|
| *H01M 8/04664* | (2016.01) | |
| *H01M 8/04082* | (2016.01) | |
| *H01M 8/0432* | (2016.01) | |
| *H01M 8/0438* | (2016.01) | |
| *G01M 3/26* | (2006.01) | |

(Continued)

(52) U.S. Cl.
CPC ......... *H01M 8/04686* (2013.01); *G01M 3/26* (2013.01); *H01M 8/0432* (2013.01);
(Continued)

(58) Field of Classification Search
CPC ......... H01M 8/04686; H01M 8/04225; H01M 8/04228; H01M 8/04201; H01M 8/04223;
(Continued)

(56) References Cited

U.S. PATENT DOCUMENTS 5,297,423 A * 3/1994 Keating ............... B67D 7/3209
73/49.2
7,127,937 B1 10/2006 Thyroff
(Continued)

FOREIGN PATENT DOCUMENTS

| CN | 1871735 A | 11/2006 |
|---|---|---|
| CN | 102288370 A | 12/2011 |

(Continued)

OTHER PUBLICATIONS

International Search Report for Application No. PCT/EP2016/073351 dated Dec. 23, 2016 (English Translation, 4 pages).

*Primary Examiner* — Mohamed Charioui
*Assistant Examiner* — Christine Y Liao
(74) *Attorney, Agent, or Firm* — Michael Best & Friedrich LLP

(57) ABSTRACT

The invention relates to a method (1) for leakage monitoring of a fuel cell system (200). According to the invention, it is provided that the leakage monitoring is carried out before or during shut-down of the fuel cell system (200) and during or after restarting of the fuel cell system (200).

4 Claims, 2 Drawing Sheets

(51) Int. Cl.
H01M 8/04223 (2016.01)
H01M 8/04225 (2016.01)
H01M 8/04228 (2016.01)

(52) U.S. Cl.
CPC ..... H01M 8/0438 (2013.01); H01M 8/04201 (2013.01); H01M 8/04223 (2013.01); H01M 8/04225 (2016.02); H01M 8/04228 (2016.02); H01M 8/04328 (2013.01); H01M 8/04373 (2013.01); H01M 8/04425 (2013.01); H01M 8/04664 (2013.01); H01M 2250/20 (2013.01)

(58) Field of Classification Search
CPC ........... H01M 8/0432; H01M 8/04328; H01M 8/04373; H01M 8/0438; H01M 8/04425; H01M 8/04664; H01M 2250/20; G01M 3/26

See application file for complete search history.

(56) References Cited

U.S. PATENT DOCUMENTS

2002/0011094 A1* 1/2002 Cook ................ F02M 25/0818
73/49.2
2007/0202367 A1* 8/2007 Yoshida ............ H01M 8/04723
429/434

FOREIGN PATENT DOCUMENTS

| CN | 102405548 A | 4/2012 |
| DE | 102006025125 | 12/2006 |
| JP | 09000405 U | 7/1997 |
| JP | 2004192919 | 7/2004 |
| JP | 2007048542 | 2/2007 |
| JP | 2007280671 A | 10/2007 |
| WO | 2009151387 | 12/2009 |

* cited by examiner

LEAKAGE MONITORING OF A FUEL CELL SYSTEM

BACKGROUND OF THE INVENTION

The invention relates to a method for leakage monitoring of a fuel cell system, a device for monitoring a fuel cell system and a fuel cell system having a device.

Pressure reducers or pressure regulators are used, for example, in fuel cell systems. The pressure regulators are connected here to a high pressure system upstream of the stack input, for example for the fuel supply of a fuel cell stack, in order to reduce the tank pressure, which can be up to 350 or 700 bar depending on the system (high pressure reducer input pressure) to a significantly lower stack input pressure of, for example 9 to 13 bar (medium pressure, pressure reducer output pressure). The pressure reducer, i.e. the pressure regulator, accordingly reduces the high pressure to the level of the medium pressure. A pressure relief valve, which is intended to protect the medium pressure system and, in particular, the fuel cell stack against risks in the case of pressure reducer defects, is installed on the medium pressure side, downstream of the pressure reducer or pressure regulator.

This safety measure, specifically the downstream connection of a pressure relief valve in the medium pressure range, upstream of the stack input, is necessary in this respect since the pressure reducer is a component which is subject to aging effects and is known to be able to fail. Known fault modes are, for example, a creeping increase in the output pressure (small leakage when system is switched off without a desired stream of gas) and, for example, a sudden increase in output pressure, and these are considered here to be relevant. In the case of a low level of leakage of the pressure reducer, the excessively high output pressure on the pressure reducer output pressure side, specifically in the medium pressure range, is reduced by triggering the pressure relief valve. However, the following disadvantages occur here:

An undesired release of the process gas or of the process fluid as a result of the reduction of gas flow via the pressure relief valve.

Furthermore, the pressure relief valve ages as a result of frequent triggering and over time becomes leaky itself, which gives rise to a continuous low level of leakage on the medium pressure side.

In addition, the triggering of the pressure relief valve can be overlooked or else merely perceived visually, for example by a protective cap which is blown off by the pressure relief valve.

It is advantageous here that after the triggering of the pressure relief valve and when the triggering of the pressure relief valve is detected, no system reaction or fault storage takes place. The failure of a system reaction or the entry into the fault memory therefore is not possible since the pressure relief valve is, for safety reasons, a passive component which cannot easily be diagnosed by a control or monitoring device.

Therefore, monitoring of the secondary pressure on the pressure reducer output pressure side during the operation of the fuel cell system is known merely as a monitoring mechanism. Detection of excessively high secondary pressure leads here to the gas supply of the process gas or of the process fluid being switched off. This monitoring mechanism is, however, not active if the controller is switched off. In vehicle applications, here in particular in motor vehicle applications, this is usually the case during the shut-down phase of the motor vehicle.

If the pressure regulator is not tight or has leakage, this initially gives rise to a (slightly) dropping input pressure and a rising secondary pressure. As a result of the triggering of the pressure relief valve which is connected downstream of the pressure regulator, the output pressure drops again and the leaking pressure regulator will continue to conduct further gas. The input pressure on the pressure regulator output pressure side or pressure reducer output pressure side consequently continues to drop until it has matched the output pressure, i.e. the secondary pressure.

In addition, changes to the system pressure can also be brought about by changes in temperature, for example if an operationally warm vehicle is shut down in cold surroundings, or a cold vehicle is moved only briefly in warm surroundings, or else the ambient temperature around the vehicle changes without the vehicle moving During the switch-off procedure of the fuel cell system which lasts several minutes it is possible to monitor the secondary pressure, to be precise in a phase in which gas consumption is functionally no longer possible. If the secondary pressure drops too severely during this procedure it can be presumed that there is a leak present in a component of the fuel cell system. However, this mechanism does not detect any small leaks which do not actually cause a perceptible drop in pressure during the switch-off procedure which lasts several minutes.

SUMMARY OF THE INVENTION

The invention proposes a method for leakage monitoring of a fuel cell system. In addition, the invention proposes a device for monitoring a fuel cell system which has a monitoring device in which the method according to the invention is stored and can advantageously be carried out on the monitoring device. Finally, the invention proposes a fuel cell system with a device according to the invention.

Further features and details of the invention are apparent from the dependent method claims, the description and the drawings. Here, features and details which are described in conjunction with the method according to the invention also self-evidently apply in conjunction with the device according to the invention and the fuel cell system according to the invention, and respectively vice versa, with the result that reference is made or can always be made reciprocally to the individual aspects of the invention in the disclosure.

The method according to the invention for leakage monitoring of a fuel cell system provides, as essential to the invention, that the leakage monitoring detects (in particular exclusively) measured values M before or during a deactivation of the fuel cell system and detects measured values N (in particular exclusively) during or after a reactivation of the fuel cell system, and compares the measured values M and N with one another. Leakage monitoring during the shut-down phase in which there is also no energy from an energy generator (e.g. fuel cell system, internal combustion engine or the like) which forms part of the fuel cell system or is operated thereby, is therefore not necessary. According to the present invention, a fuel cell system, a tank system and/or an internal combustion engine is to be understood here, for example, as a fuel cell system, wherein, in particular at least one pressure regulator is used for regulating the fuel.

The method according to the invention is advantageous in that a leakage or a pressure regulator leak is also or just detected, or can also or just be operated, when the system is switched off, without any energy consumption, specifically in the shut-down phase after the deactivation of the fuel cell system until the reactivation of the fuel cell system. In this context, an only through temperature effects without pressure regulator leakage or a leak triggering of the pressure relief valve can advantageously be detected when the system is switched off, i.e. in the phase after the deactivation up to the reactivation of the fuel cell system. In addition, with the method according to the invention it is advantageously possible to verify a small system leak onto the medium pressure range or high pressure range, i.e. onto the medium pressure or high pressure system of the fuel cell system. In order to be able to carry out or bypass the leakage monitoring for the shut-down phase which occurs between the deactivation of the fuel cell system and the subsequent reactivation of the fuel cell system, a temperature measurement and a pressure measurement are advantageously carried out in the fuel cell system before the deactivation of the fuel cell system, wherein the measured values which occur here for the pressure and temperature are considered to be measured values M. In this context an output pressure sensor on the pressure regulator output pressure side advantageously measures the output pressure MP1 and an input pressure sensor measures the input pressure HP1 (measured values M) on the pressure regulator input side. In addition, a temperature sensor advantageously measures the system temperature T1 (measured values M) or iT2 (measured values M) in the fuel cell system, wherein the temperature sensor can be arranged, for example, in a combined housing together with the output pressure sensor.

The measured values T1, MP1 and HP1 which are measured during the temperature measurement and pressure measurement of the fuel cell system are preferably advantageously detected by a monitoring device and standardized to a standard temperature nT1, which is, for example, 20° C., and stored as standardized values nMP1 and nHP1 in a non-volatile memory of the monitoring device. The standardization of the measured pressure values MP1 and HP1 to the values nMP1 and nHP1 which are standardized according to the standard temperature nT1 advantageously gives rise here to a marked improvement in the detection accuracy of the method according to the invention and of the device according to the invention. As a result, inaccuracy which is caused by temperature effects (e.g. by cooling the system) and which can contribute to pressure changes in the two-digit percentage range is avoided.

As the method according to the invention advantageously provides that after deactivation of the fuel cell system, with subsequent reactivation of the fuel cell system the temperature measurement and pressure measurement of the fuel cell system are repeated, meaning if energy consumption is possible again, since an energy generator of the system preferably supplies energy again. This means that after the fuel cell system is switched on again the pressures and temperatures which prevail when the fuel cell system is switched on again or reactivated are detected. In this context, the temperature measured values and pressure measured values T2, MP2 and HP2 (also referred to as measured values N) which are measured when the fuel cell system is subsequently reactivated, are advantageously standardized to an actual temperature iT2, which deviates from the standard temperature nT1, of the fuel cell system to iMP2 and iHP2. This means that the pressure values and temperature values T2, MP2 and HP2 which are detected during reactivation are also temperature-corrected, specifically advantageously in order to avoid inaccuracies of the pressure values MP2 and HP2 which are measured during reactivation of the fuel cell system. The actual temperature iT2 is to be understood here as meaning that the actual temperature which prevails when the system is reactivated is detected. If, for example, the standardized values nMP1 and nHP1 are corrected to a standard temperature nT1 of 20° C., when the fuel cell system is reactivated at a temperature of, for example, 5° C. a measuring inaccuracy owing to a change in pressure caused by temperature effects can be avoided, wherein in the selected example the standard temperature nT1 deviates from the actual temperature iT2 by 15° C. Accordingly, the standardization of the pressure measured values MP2 and HP2, deviating from the standard temperature nT1 to the actual temperature iT2, also advantageously brings about an improvement in the detection accuracy of the method according to the invention and the device according to the invention.

The measured values iMP2 and iHP2 which are standardized from the standard temperature nT1 to the deviating actual temperature iT2 of the fuel cell system are advantageously compared with the stored measured values nMP1 and nHP1, preferably compared by means of the monitoring device with each other. For example a fluid loss from the fuel cell system is advantageously detected by the comparison of the temperature-corrected measured values nMP1 and nHP1 with the measured values iMP2 and iHP2 which are measured when the system is switched on again and standardized to the actual temperature iT2. If, for example, the medium pressure side and high pressure side of the fuel cell system are technically tight here, no detectable pressure drop occurs over a typical shut-down phase (e.g. overnight), which can be confirmed on the basis of the comparison of measured values nMP1 and nHP1 with the measured values iMP2 and iHP2.

However, during the comparison of the measured values nMP1 and nHP1 with the measured values iMP2 and iHP2 a value which is determined therefrom is above a parameterizable minimum limit, after the shut-down phase of this system with subsequent reactivation of the system it is possible to assume a loss of gas. In this context the minimum detected leakage rate can advantageously be defined by means of a calibration parameter.

In order to specify the leakage which causes the leakage rate, according to the method according to the invention the input pressure HP1 and HP2 is advantageously sensed on a component input pressure side, and the output pressure MP1 and MP2 is sensed on a component output pressure side, by which means the location of the fluid loss from the fuel cell system to the component input pressure side and/or the component output pressure side can advantageously be specified. By sensing the input pressure HP1 and HP2 on the component input pressure side and by sensing the output pressure MP1 and MP2 on the component output pressure side the location of the fluid loss from the fuel cell system to the medium pressure side (component input pressure side) or the high pressure side (component output pressure side) of the fuel cell system can be determined.

With the method according to the invention the following can advantageously be detected when the temperature-corrected input pressure HP2 drops, specifically by comparison of the input pressure nHP1, which has been standardized to the standard temperature nT1, with the input pressure iHP2, which has been standardized to the actual temperature iT2, beyond a limit which can be calibrated:

a) If the current and standardized input pressure iHP2 is significantly lower in comparison with the stored input pressure nHP1 than a lower pressure relief valve hysteresis threshold (at which a triggered pressure relief valve closes again), the loss of gas can be attributed to a leak to the outside. The term "essentially" means that the pressure difference cannot be explained by cooling.

Example: The system temperature is reliably between −20° C. and +50° C. under all ambient conditions. The triggering of the pressure relief valve at 15 bar, re-closing at 13.5 bar, at 323 K. Cooling at 253 K brings about a pressure drop to approximately 10.5 bar.~A pressure<approximately 10 bar cannot be caused (only) by a triggered pressure relief valve.

b) If the current and standardized input pressure iHP2 and the current and standardized output pressure iMP2 are, in comparison with the stored input pressure nHP1 and with the stored output pressure nMP2, equal to the lower pressure relief valve hysteresis threshold (for example in the range which can therefore result from temperature effects), the loss of gas can probably be attributed to a triggered pressure relief valve, and therefore to a leak in the pressure regulator or pressure reducer. In this case, the pressure measurement can be continued if the determination of the location of the fault source is to be more reliable. If the pressure then does not drop further in the further course of the process, the gas loss can reliably be attributed to a leak in the pressure regulator or pressure reducer.

c) If the current and standardized input pressure iHP2 is no longer of the same magnitude as at the shut-down time HP1, temperature corrected to nHP1, but still far higher than the output pressure iMP2, a defined loss of gas has occurred. This loss of gas can possibly be attributed to a rise in pressure in the medium pressure part (medium pressure system) because of a rise in temperature and triggering of the pressure relief valve which is caused as a result. In this case, the pressure measurement HP2 and MP2 can be continued if the determination of the location of the fault source is to be more reliable. If the pressure then does not drop further in the further course of the process, the loss of gas can reliably be attributed to the temperature effect.

The present invention also proposes a device for monitoring a fuel cell system, in particular for leakage monitoring before or during deactivation of the fuel cell system during or after subsequent reactivation of the fuel cell system, wherein the device has a monitoring device in which the method according to the invention is stored. The method according to the invention is advantageously also carried out with the monitoring device.

In addition, the present invention proposes a fuel cell system having a device according to the invention and having a pressure regulator with a pressure regulator input pressure side and a pressure regulator output pressure side, wherein a fluid with an input pressure HP1 or HP2 can be introduced into the pressure regulator via the pressure regulator input pressure side, and after flowing through the pressure regulator can be discharged from the pressure regulator with an output pressure MP1 or MP2 via the pressure regulator output pressure side, at least one pressure relief valve which is arranged on the pressure regulator output pressure side, an input pressure sensor with which the input pressure HP1 and HP2 on the pressure regulator input pressure side can be sensed, an output pressure sensor with which the output pressure MP1 and MP2 on the pressure regulator output pressure side can be sensed, and at least one temperature sensor with which the temperature T1 and iT2 in the fuel cell system can be measured.

In order to avoid repetitions with respect to further advantages of the device according to the invention and of the fuel cell system according to the invention, reference is made to the description of the advantageous refinement of the method according to the invention and recourse is made to the entire scope thereof.

BRIEF DESCRIPTION OF THE DRAWINGS

Further measures which improve the invention are apparent from the following description of exemplary embodiments of the invention which are illustrated schematically in the figures. All of the features and/or advantages, including structural details, spatial arrangements and method steps which arise from the claims, the description or the drawings, can be essential to the invention both per se and in a wide variety of combinations. It is to be borne in mind here that the figures only have a descriptive character and are not intended to limit the invention in any way. In the drawings:

DETAILED DESCRIPTION

In the different figures, identical parts are always provided with the same reference symbols, which is why they are generally described only once.

Figure 1:
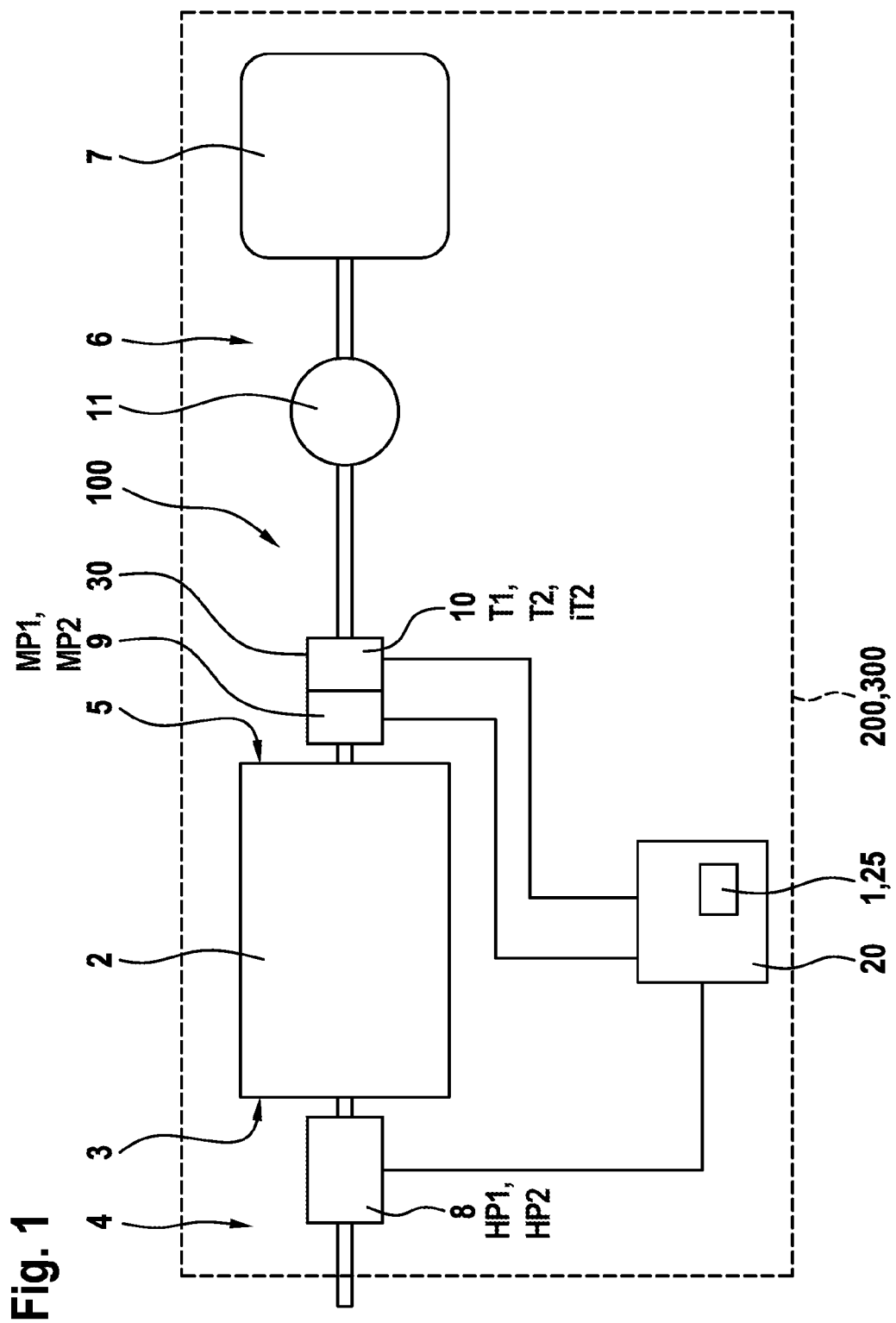
FIG. 1 shows an exemplary embodiment of a device according to the invention.

FIG. 1 shows a schematic illustration of an embodiment variant of a device 100 according to the invention in a fuel cell system 200 which is here a fuel cell system 100 of a fuel cell system 300. The device 100 serves to monitor a pressure regulator 2. The pressure regulator 2 is fluidically connected to a high pressure system 4 of the fuel cell system 300 via a pressure regulator input pressure side 3. The pressure regulator 2 is fluidically connected via a pressure regulator output pressure side 5 to a medium pressure system 6 of the fuel cell system 300 which is connected into a fuel cell stack 7 of the fuel cell system 300. The pressure regulator 2 serves to reduce the process gas, process fluid or combustion gas, for example hydrogen, which is conducted at a pressure of 350 to 700 bar from the high pressure system 4 to the pressure level for the stack input pressure, wherein the pressure level in the medium pressure system 6 is advantageously approximately 9 to 13 bar. Accordingly, the process gas at a pressure of 9 to 13 bar is conducted via the medium pressure system 6 into the fuel cell stack 7 of the fuel cell system 300. An input pressure sensor 8 is arranged at the high pressure system 4 before the pressure regulator input pressure side 3 and measures the input pressure HP1 and HP2 on the input pressure side 3 of the pressure regulator 2. A pressure sensor, specifically an output pressure sensor 9, which measures the output pressure MP1 and MP2 of the process gas or of the process fluid which is adjusted down from the pressure level of the high pressure system 4 to the pressure level of the medium pressure system 6 by the pressure regulator 2 is also arranged on the pressure regulator output pressure side 5 in the medium pressure system 6. In addition, a temperature sensor 10 which serves to measure the temperature T1, T2 and iT2 of the fuel cell system is arranged in a housing 30 which surrounds the output pressure sensor 9. Both the input pressure sensor 8 and the output pressure sensor 9, as well as the temperature sensor 10 are electrically and/or electronically connected to a monitoring device 20. The monitoring device 20 comprises a memory 25 in which the values HP1 and MP1 which are measured by the input pressure sensor Band the output pressure sensor 9 and which have been standardized to the values nHP1 and nMP1 at a standard temperature nT1 stored in the memory are stored. Calibration parameters for minimum limits or tolerance thresholds and the method 1 according to the invention are advantageously stored in the memory 25, which serves to assign the values T2, iT2, HP2 and MP2 determined by means of a comparison of the temperature and pressure values T1, HP1 and MP1, determined during the deactivation, with the temperature and pressure values determined during the subsequent reactivation, to a functional state of the pressure regulator 2 or of the fuel cell system 100, i.e. for example in order to detect a leakage in the fuel cell system 100 such as, for example, in the pressure regulator 2. In addition values an upper pressure relief valve hysteresis threshold 400 and a lower pressure relief valve hysteresis threshold 500 for a pressure relief valve 11 which is arranged in the medium pressure system 6 are advantageously stored on the memory 25. If, for example, the input pressure iHP2 which is temperature-corrected to the actual temperature iT2 has dropped compared to the input pressure nHP1 which has been saved or stored in the memory 25 and standardized or temperature-corrected to the standard temperature nT1, specifically has dropped beyond the limit which can be calibrated, a loss of gas from the fuel cell system 200 can be detected or signaled by means of the monitoring device 20.

Figure 2:
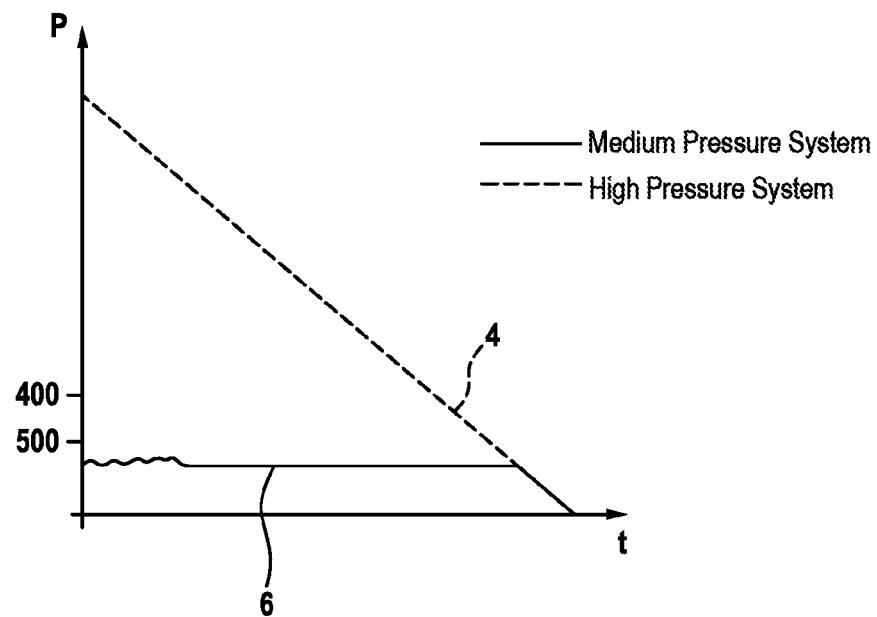
FIG. 2 shows a diagram illustrating the detection of a leaking system with the method according to the invention.

FIG. 2 shows a diagram illustrating the detection of a leaking fuel cell system 200 on the basis of a temperature-corrected input pressure iHP2, which in comparison with the stored input pressure nHP1, has dropped beyond the limit which can be calibrated. If this is the case, the monitoring device 20 detects a loss of gas from the fuel cell system 200. In the diagram, the time t is plotted on the X axis and the pressure P on the Y axis. As is apparent, the current input pressure iHP2 is significantly lower than the lower pressure relief valve hysteresis threshold 500 at which the triggered pressure relief valve 11 closes again. The method 1 according to the invention detects, with the device according to the invention, a loss of gas which can be attributed to a leak of the fuel cell system 200 toward the outside. The upper pressure relief valve hysteresis threshold is indicated on the Y axis by 400. A significantly lower current input pressure iHP2 means that the pressure difference between the value for the input pressure nHP1 which is stored in the memory 25 of the monitoring device 20 and which is measured when the fuel cell system 200 is deactivated and also the standard temperature nT1 has been standardized, cannot be clarified by cooling the fuel cell system 200. If, for example, the temperature iT2 is between −20° C. and +50° C., the pressure relief valve 11 would trigger at an assumed upper pressure relief valve hysteresis threshold 400 of 15 bar and would close again at a lower pressure relief hysteresis threshold 500 of 13.5 bar at 323 K. Cooling of the fuel cell system 200 to an actual temperature iT2 of 253 K would bring about a drop in pressure to approximately 10.5 bar. Accordingly, the current input pressure iHP2, which is less than 10 bar, can be caused not only by the triggered pressure relief valve 11. In this respect, a leaking fuel cell system 200 toward the outside is to be inferred.

Figure 3:
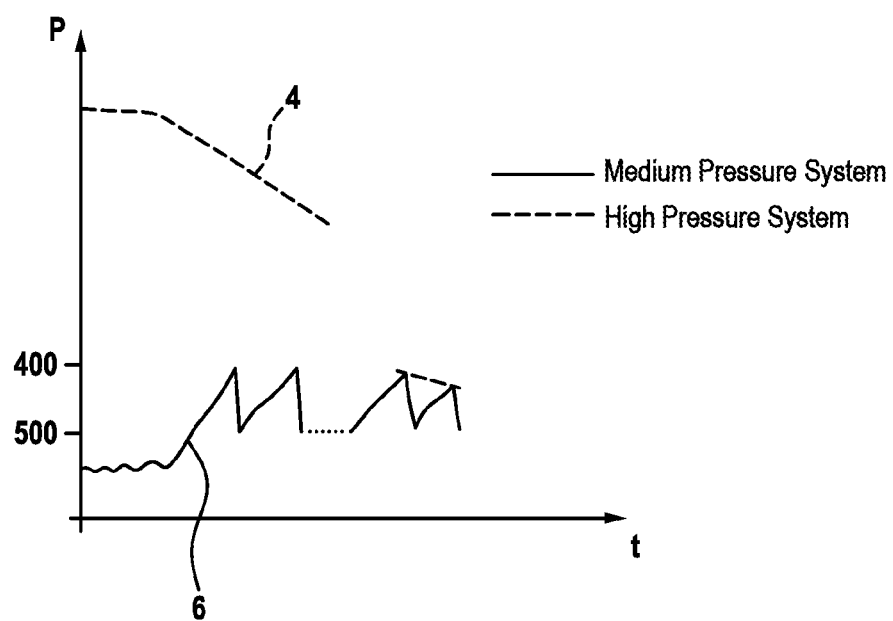
FIG. 3 shows a diagram with detecting of a leaking pressure regulator according to the method according to the invention.

FIG. 3 shows the detection of a leaking pressure regulator 2 in the case of a current input pressure iHP2 which has dropped and a current output pressure iNP2 which dropped, both pressures being equal to the lower pressure relief valve hysteresis threshold 500 for the pressure relief valve 11. In this context, a loss of gas from the fuel cell system 200 can probably be attributed to a triggered pressure relief valve 11, and therefore to a leak or leakage of the pressure regulator 11. In order to offset the leak of the pressure regulator 2, specifically in order to set the pressure level in the medium pressure system 6, the pressure relief valve 11 opens and closes until the pressure level in the medium pressure system 6 is set, or else the leakage of the pressure regulator 2 ends. In order to verify the determination of the location of the fault source precisely to the pressure regulator 2 in this case, the pressure measurement is advantageously continued via the input pressure sensor 8 and the output pressure sensor 9. If the input pressure HP2 and the output pressure MP2 does not drop further in the further course of the measurement, then the loss of gas can be reliably attributed to a pressure regulator leak.

The invention claimed is:

1. A method for leakage monitoring of a fuel cell system, the method comprising:
    acquiring measured values M before or during deactivation of the fuel cell system, acquiring measured values N during or after reactivation of the fuel cell system, and
    comparing the measured values M and N with one another,
    characterized in that before deactivation of the fuel cell system the measured values M are acquired in the form of a temperature measurement and pressure measurement in the fuel cell system,
    wherein the measured values M which are measured during the temperature measurement and pressure measurement of the fuel cell system comprise a temperature measured value T1, an output pressure measured value MP1 and an input pressure measured value HP1 which are standardized to a standard temperature nT1 and are stored as standardized values nMP1 and nHP1 in a non-volatile memory,
    wherein during subsequent reactivation of the fuel cell system the measured values N are acquired by means of a temperature measurement and pressure measurement of the fuel cell system,
    wherein the measured values N comprise a temperature measured value T2, an output pressure measured value MP2, and an input pressure measured value HP2 which are standardized to an actual temperature iT2 of the fuel cell system, which is different from the standard temperature nT1, to determine standardized values iMP2 and iHP2,
    wherein the standardized values iMP2 and iHP2 are compared with the standardized values nMP1 and nHP1, and
    wherein a fluid loss from the fuel cell system is detected by means of the comparison of the standardized values nMP1 and nHP1 with the standardized values iMP2 and iHP2.

2. The method as claimed in claim 1, characterized in that the location of the fluid loss from the fuel cell system is specified to the component input pressure side and/or the component output pressure side by sensing the input pressure measured value HP1 and the input pressure measured value HP2 on a component input pressure side and by sensing the output pressure measured value MP1 and the output pressure measured value MP2 on a component output pressure side.

3. A device for monitoring a fuel cell system, the device comprising a monitoring device in which the method as claimed in claim 1 is stored.

4. A fuel cell system comprising
a device as claimed in claim 3,
a pressure regulator with a pressure regulator input pressure side and a pressure regulator output pressure side, wherein a fluid can be introduced into the pressure regulator with an input pressure HP via the pressure regulator input pressure side, and after flowing through the pressure regulator said fluid can be discharged from the pressure regulator with an output pressure MP via the pressure regulator output pressure side,
at least one pressure relief valve which is arranged on the pressure regulator output pressure side,
an input pressure sensor with which the input pressure HP on the pressure regulator input pressure side can be sensed,
an output pressure sensor with which the output pressure MP on the pressure regulator output pressure side can be sensed, and
at least one temperature sensor with which the temperature T in the fuel cell system can be measured.

\* \* \* \* \*